(12) United States Patent
Pi

(10) Patent No.: US 12,228,453 B2
(45) Date of Patent: Feb. 18, 2025

(54) HAZARDOUS INGREDIENT MEASURING APPARATUS AND HAZARDOUS INGREDIENT ANALYZING SYSTEM USING SAME

(71) Applicant: PIQUANT. CO., LTD., Seoul (KR)

(72) Inventor: Do Yeon Pi, Seoul (KR)

(73) Assignee: PIQUANT. CO., LTD., Seoul (KR)

( * ) Notice: Subject to any disclaimer, the term of this patent is extended or adjusted under 35 U.S.C. 154(b) by 200 days.

(21) Appl. No.: 17/821,753

(22) Filed: Aug. 23, 2022

(65) Prior Publication Data

US 2022/0404201 A1 Dec. 22, 2022

Related U.S. Application Data

(63) Continuation of application No. PCT/KR2021/003449, filed on Mar. 19, 2021.

(30) Foreign Application Priority Data

Mar. 20, 2020 (KR) .................. 10-2020-0034577
Jan. 25, 2021 (KR) .................. 10-2021-0010325

(51) Int. Cl.
  *G01N 15/0227* (2024.01)
  *G01J 3/28* (2006.01)

(52) U.S. Cl.
  CPC ........ *G01J 3/2823* (2013.01); *G01N 15/0227* (2013.01)

(58) Field of Classification Search
  CPC ............ G01J 3/2823; G01J 2003/2826; G01N 15/0205; G01N 15/0227
  See application file for complete search history.

(56) References Cited

U.S. PATENT DOCUMENTS

| 2011/0086415 A1* | 4/2011 | Tustison | .................. G01N 1/40 |
| | | | 435/235.1 |
| 2016/0091366 A1* | 3/2016 | Yang | ..................... G01J 3/0237 |
| | | | 356/301 |
| 2016/0256097 A1* | 9/2016 | Manautou | ............ G01N 1/2273 |
| 2018/0160510 A1 | 6/2018 | Ramer et al. | |

FOREIGN PATENT DOCUMENTS

| CN | 103877824 A | * | 6/2014 |
| CN | 107219180 A | * | 9/2017 |
| CN | 110579470 A | * | 12/2019 |

(Continued)

OTHER PUBLICATIONS

International Search Report issued in PCT/KR2021/003449; mailed Jun. 29, 2021.

(Continued)

*Primary Examiner* — Maurice C Smith
(74) *Attorney, Agent, or Firm* — Studebaker & Brackett PC

(57) ABSTRACT

The present invention relates to a hazardous material measuring apparatus capable of analyzing concentration and components of various hazardous materials. The hazardous material measuring apparatus analyzes an optical spectrum obtained by a spectrometer or a hyperspectral image obtained by a hyperspectral camera, thereby analyzing concentration and components of the hazardous materials to be measured.

11 Claims, 9 Drawing Sheets

(56) References Cited

FOREIGN PATENT DOCUMENTS

| KR | 10-2010-0101305 A | 9/2010 |
| KR | 10-2011-0127504 A | 11/2011 |
| KR | 10-1532174 B1 | 6/2015 |
| KR | 10-2017-0135019 A | 12/2017 |
| KR | 10-2018-0060307 A | 6/2018 |
| KR | 10-2019-0084691 A | 7/2019 |
| KR | 10-2020-0009707 A | 1/2020 |
| KR | 102448715 B1 * | 9/2022 |

OTHER PUBLICATIONS

Office Action issued in KR 10-2021-0010325; mailed by the Korean Intellectual Patent Office on Jan. 3, 2022.

* cited by examiner

HAZARDOUS INGREDIENT MEASURING APPARATUS AND HAZARDOUS INGREDIENT ANALYZING SYSTEM USING SAME

CROSS-REFERENCE TO RELATED APPLICATION

The present application is a continuation of International Patent Application No. PCT/KR2021/003449, filed on Mar. 19, 2021, which is based upon and claims the benefit of priority to Korean Patent Application Nos. 10-2021-0010325, filed on Jan. 25, 2021 and 10-2020-0034577, filed on Mar. 20, 2020. The disclosures of the above-listed applications are hereby incorporated by reference herein in their entirety.

BACKGROUND

1. Technical Field

The present invention relates to a measuring apparatus capable of analyzing concentration and components of hazardous materials, and more specifically, to a hazardous material measuring apparatus capable of measuring concentration of hazardous materials existing in the air and analyzing components contained in the hazardous materials.

2. Description of Related Art

Recently, with an increase in the degree of interest for hazardous materials, hazardous material-related laws are increasing.

For example, the market for products, such as air purifiers, masks, or the like, associated with fine dust, which is a representative hazardous material, is rapidly growing.

Information on such fine dust gives only concentration of fine dust, but only the concentration of the fine dust is not important. A fatal component to a human body according to components constituting the fine dust may be contained included in the hazardous material.

For example, in a case in which components contained in the hazardous material are components generated in a factory or an industrial field based on chemical materials or heavy metals, the risk level may be diverse.

However, conventionally used hazardous material measuring methods are limited to measuring the amount of hazardous materials, and have a limitation in measuring the components of the hazardous materials.

In addition, a technique to implement a small-sized apparatus capable of measuring not only concentration of hazardous materials but also components of the hazardous materials has not been disclosed until now.

Therefore, the present disclosure has been invented as a small-sized apparatus capable of not only measuring concentration of hazardous materials but also analyzing components of the measured hazardous materials so that lots of people can obtain accurate information on hazardous materials.

SUMMARY

The present disclosure has been made to solve the above-mentioned problems occurring in the prior art, and in an aspect of the present disclosure, an object is to provide a hazardous material measuring apparatus and a hazardous material analyzing system using the same, which can analyze components and concentration of hazardous materials through analysis of an optical spectrum obtained by using incident light colliding against the hazardous material particles.

Another object is to provide a hazardous material measuring apparatus and a hazardous material analyzing system using the same, which can obtain a hyperspectral image of the external air introduced into the hazardous material measuring apparatus through a hyperspectral camera, and analyze the hyperspectral image to analyze components and concentration of hazardous materials.

A further object is to provide a hazardous material measuring apparatus and a hazardous material analyzing system using the same, which can determine the position of a hazardous material measuring module according to the size of analysis target particles in consideration of an angle of an optical path varying according to the particle size.

A still further object is to provide a hazardous material measuring apparatus and a hazardous material analyzing system using the same, capable of measuring noise, temperature, humidity, atmospheric pressure, illuminance, and early fire detection as well as analyzing the concentration and the components of hazardous materials.

The aspects of the present disclosure are not limited to those mentioned above, and other aspects not mentioned herein will be clearly understood by those skilled in the art from the following description.

To accomplish the above objects, in an aspect of the present disclosure, there is provided a hazardous material measuring apparatus including: an air distribution unit which is mounted inside a case of the hazardous material measuring apparatus and into which external air is introduced and circulated; a light emitting unit irradiating light to an area where the external air is distributed in the air distribution unit; a light incident unit that light changed in a path by colliding against hazardous material particles enters; a spectrometer obtaining an optical spectrum of the incident light; and a processor for deriving components and concentration of hazardous material particles contained in the external air introduced into the air distribution unit on the basis of the optical spectrum acquired through the spectrometer, wherein the spectrometer determines an installation position according to the size of the analysis target particles in consideration of an angle of the optical path changed according to the particle size.

Moreover, the hazardous material measuring apparatus further includes a position adjusting means capable of adjusting the position of the spectrometer according to the size of the analysis target particles.

Furthermore, the optical path is changed when the light irradiated perpendicularly to the air distribution unit collides against the hazardous material particles contained in the external air in the air distribution unit 60, and the light changed in the optical path passes through the light incident unit so that the spectrometer obtains the optical spectrum.

Additionally, the hazardous material measuring apparatus further includes at least one fan for introducing the external air into the hazardous material measuring apparatus.

In addition, when receiving a hazardous material measurement request signal, the processor actuates the fan to introduce the external air into the air distribution unit, stops the fan or reduces air speed, and then, starts measurement of hazardous materials.

Moreover, the fan includes: a first fan for introducing the external air into the hazardous material measuring apparatus; and a second fan for introducing the external air introduced by the first fan into the air distribution unit.

Furthermore, the hazardous material measuring apparatus further includes a case in which a hazardous material measuring module including at least one among the light emitting unit, the spectrometer, the processor and the database is installed, wherein the hazardous material measuring module is installed at one side in the case, and the first fan is mounted at the other side in the case, and is higher in air volume or speed than the second fan.

Additionally, the hazardous material measuring apparatus further includes a database storing optical spectrum information for each component which may be contained in the hazardous material, wherein the processor analyzes the obtained optical spectrum on the basis of the optical spectrum information stored in the database, thereby deriving components and concentration of the hazardous materials contained in the external air.

In addition, the hazardous material measuring apparatus further includes a noise measuring module capable of measuring external noise generated around the hazardous material measuring device.

To accomplish the above objects, in another aspect of the present disclosure, there is provided a hazardous material measuring server utilizing an optical spectrum including: a communication unit receiving optical spectrum data from a hazardous material measuring apparatus; a database storing optical spectrum information for each component which may be contained in the hazardous material; and a processor analyzing optical spectrum data received through the communication unit to analyze components of hazardous material particles contained in external air introduced into an air distribution unit of the hazardous material measuring apparatus, wherein the hazardous material measuring apparatus includes: an air distribution unit which is mounted inside a case of the hazardous material measuring apparatus and into which external air is introduced and circulated; a light emitting unit irradiating light to an area where the external air is distributed in the air distribution unit; a light incident unit that light changed in a path by colliding against hazardous material particles enters; a spectrometer obtaining an optical spectrum of the incident light; and a processor transmitting the obtained optical spectrum data to the hazardous material measuring server through the communication unit. The spectrometer determines an installation position according to the size of the analysis target particles in consideration of an angle of the optical path changed according to the particle size.

To accomplish the above objects, in a further aspect of the present disclosure, there is provided a hazardous material measuring apparatus including: an air distribution unit into which external air is introduced and circulated; a hyperspectral camera photographing a predetermined area of the air distribution unit to obtain a hyperspectral image of hazardous material particles existing in the predetermined area; and an analysis unit for deriving components and concentration of the hazardous material particles contained in the external air introduced into the air distribution unit on the basis of the obtained hyperspectral image.

Moreover, the hazardous material measuring apparatus further includes a position adjusting means capable of adjusting the position of the spectrometer according to the size of the analysis target particles.

Furthermore, the hazardous material measuring apparatus further includes a database storing optical spectrum information for each component which may be contained in the hazardous material, wherein the analysis unit analyzes the obtained hyperspectral image based on information stored in the database, thereby deriving components of the hazardous materials contained in the external air introduced into the air distribution unit.

Additionally, the hazardous material measuring apparatus further includes at least one fan for introducing the external air into the hazardous material measuring apparatus.

In addition, the hazardous material measuring apparatus further includes a position adjusting means capable of adjusting the position of the spectrometer according to the size of the analysis target particles.

Besides the above, a computer program stored in a computer readable recording medium for embodying the present disclosure may be additionally provided.

Besides the above, a computer readable recording medium to record computer programs for executing the method may be additionally provided.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should be interpreted in an idealized or overly formal sense unless expressly so defined herein.

Hereinafter, preferred embodiments of the present disclosure will be described in detail with reference to the accompanying drawings.

Figure 1:
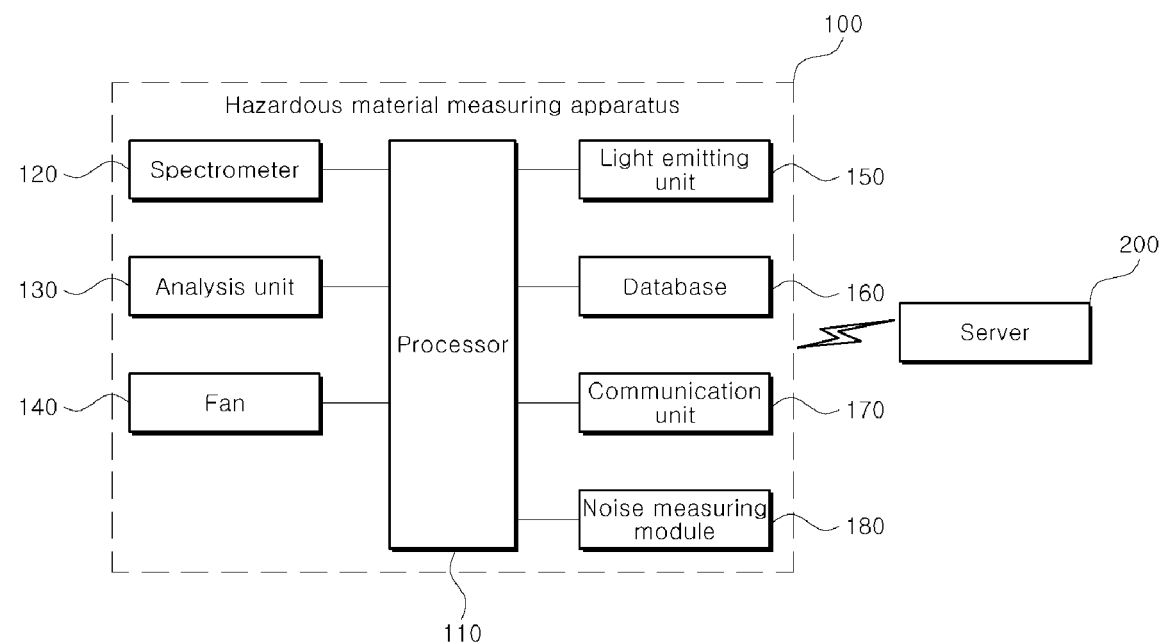
FIGS. 1 and 2 are block diagrams of a hazardous material measuring apparatus according to an embodiment of the present invention.
Figure 2:
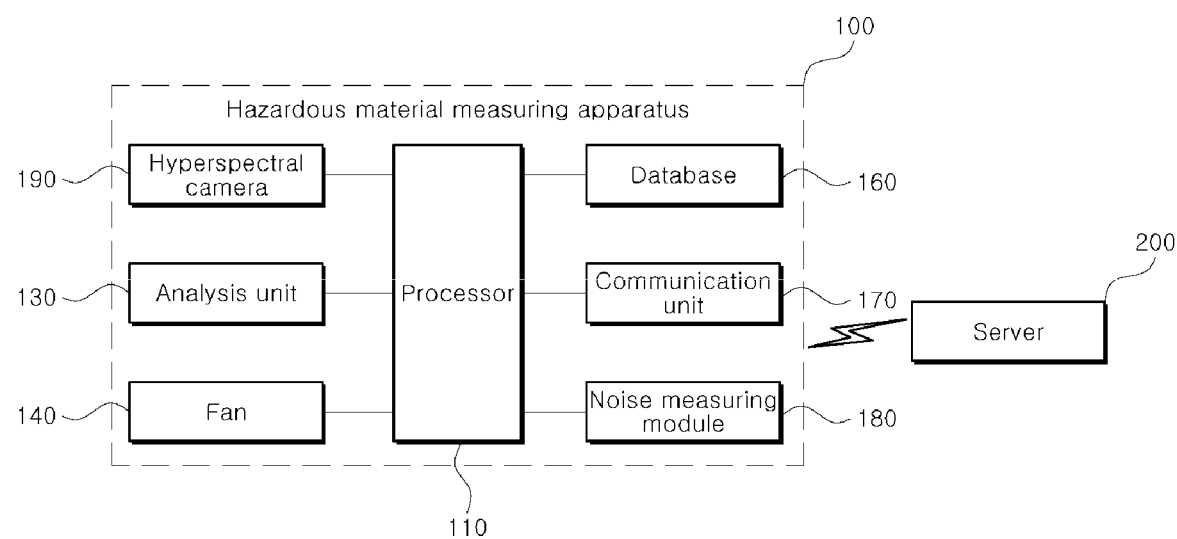

FIGS. 1 and 2 are block diagrams of a hazardous material measuring apparatus 100 according to an embodiment of the present invention.

Figure 3:
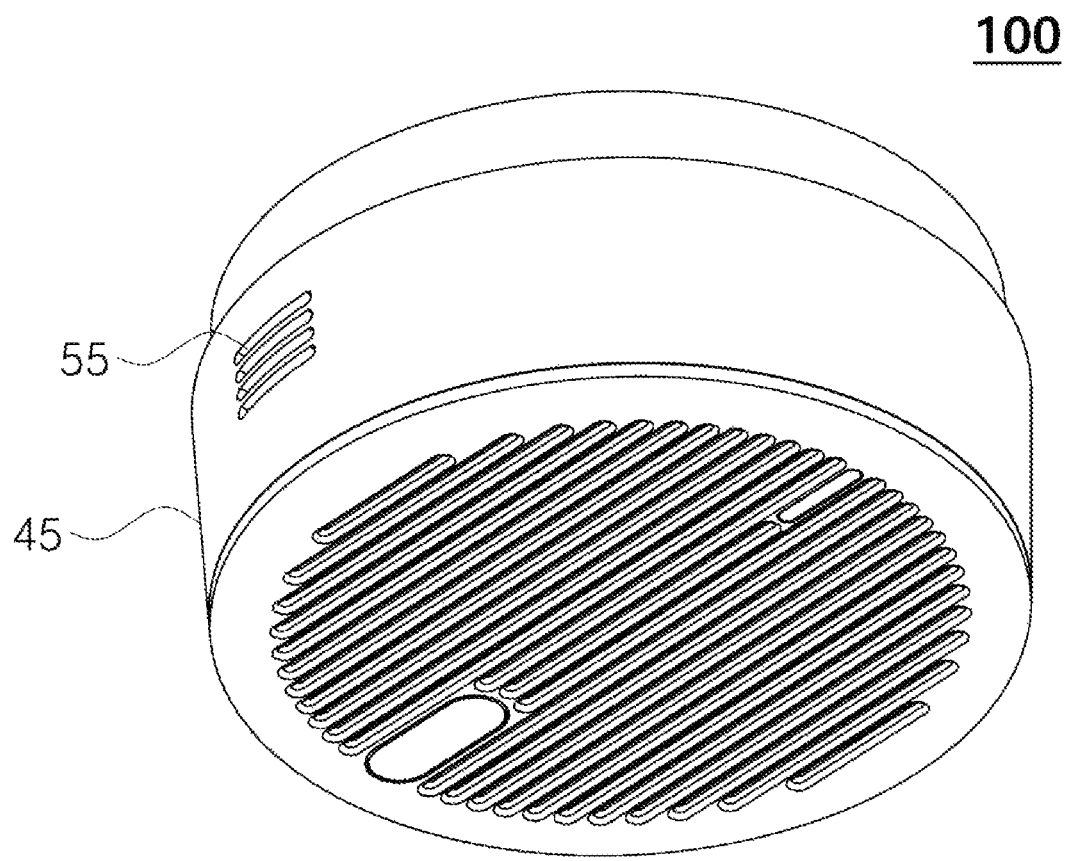
FIG. 3 is a diagram illustrating the hazardous material measuring apparatus installed on the ceiling.

FIG. 3 is a diagram illustrating the hazardous material measuring apparatus 100 installed on the ceiling.

Figure 4:
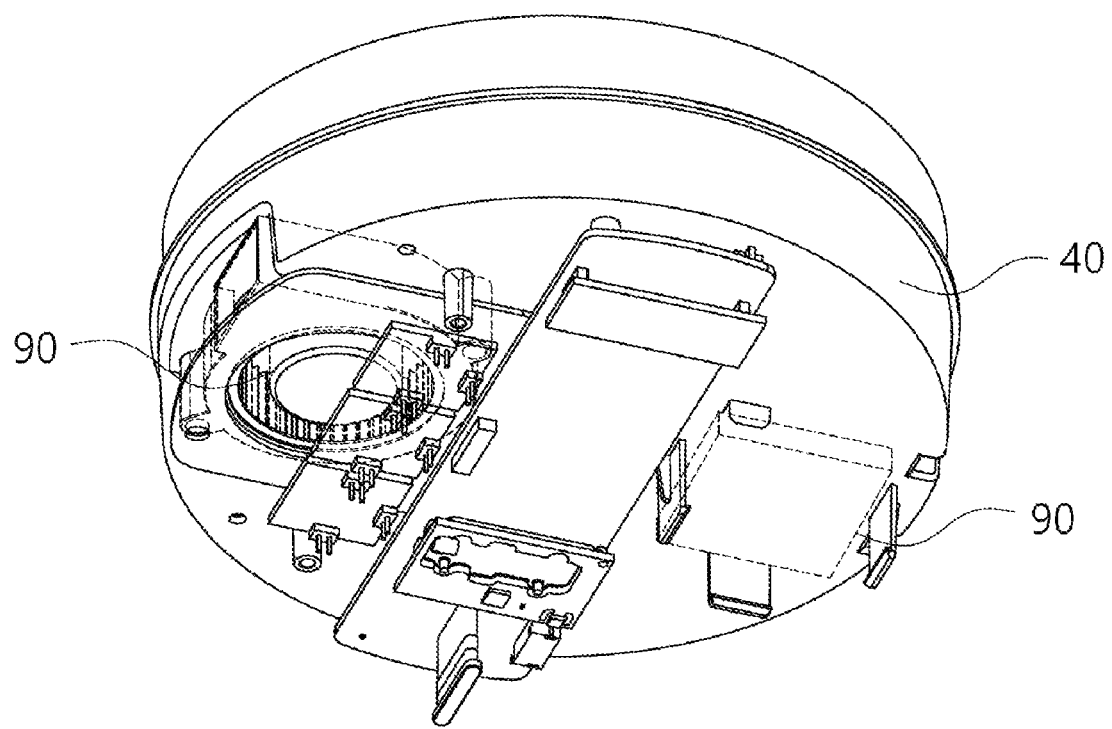
FIG. 4 is a diagram illustrating the inside of the hazardous material measuring apparatus according to the embodiment of the present invention.

FIG. 4 is a diagram illustrating the inside of the hazardous material measuring apparatus 100 according to the embodiment of the present invention.

Figure 5:
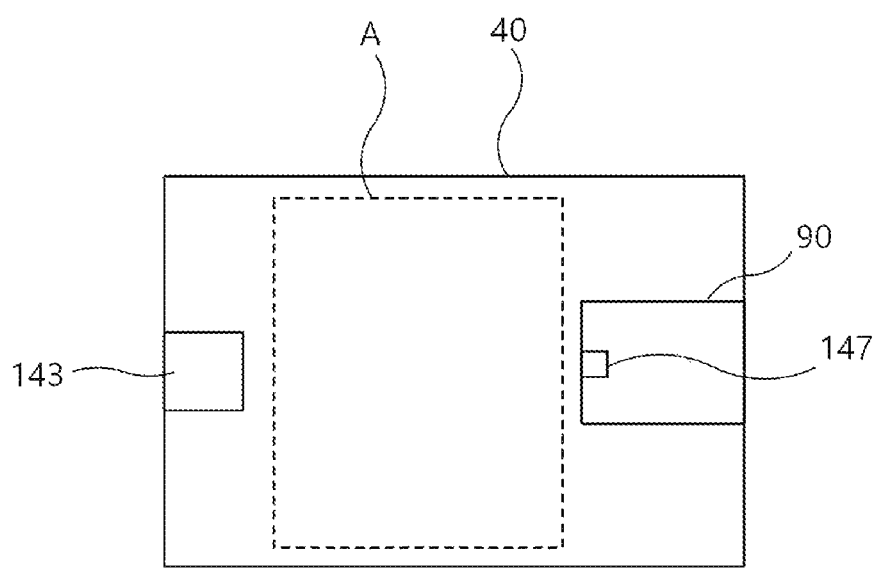
FIG. 5 is a diagram illustrating the inside of the inside of the hazardous material measuring apparatus in order to describe positions of a first fan and a second fan.

FIG. 5 is a diagram illustrating the inside of the inside of the hazardous material measuring apparatus 100 in order to describe positions of a first fan 143 and a second fan 147.

Figure 6:
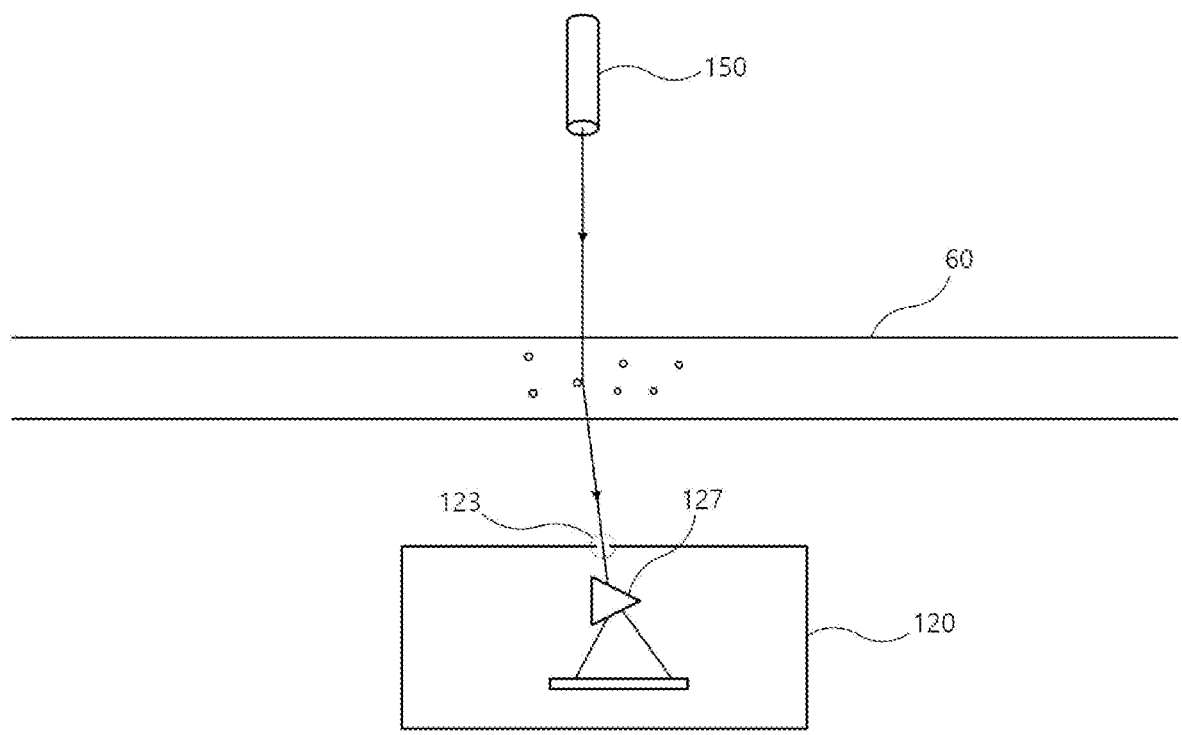
FIG. 6 is a diagram illustrating a state in which a spectrometer obtains an optical spectrum in the embodiment of the present invention.

FIG. 6 is a diagram illustrating a state in which a spectrometer 120 obtains an optical spectrum in the embodiment of the present invention.

Figure 7:
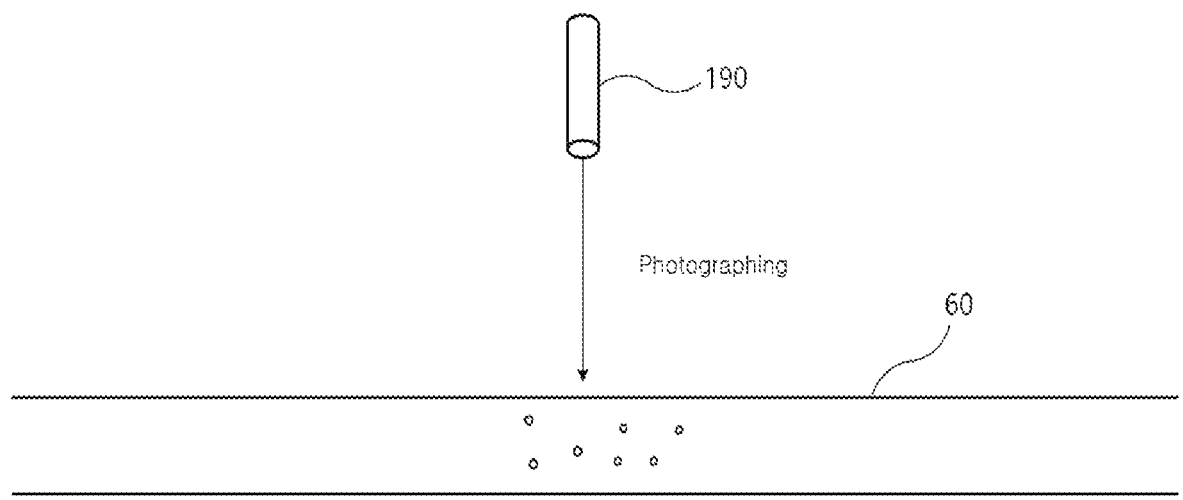
FIG. 7 is a diagram illustrating a state in which a hyperspectral camera obtains a hyperspectral image of hazardous material in the embodiment of the present invention.

FIG. 7 is a diagram illustrating a state in which a hyperspectral camera 190 obtains a hyperspectral image of hazardous material in the embodiment of the present invention.

A hazardous material measuring apparatus 100 according to an embodiment of the present invention will be described with reference to FIGS. 1 and 3 to 6.

In the embodiment of the present invention, the hazardous material measuring apparatus 100 can measure and analyze various hazardous materials, harmful gases, fine dust, and the like.

The hazardous materials and harmful gases may include components, such as Cox, Sox, NOx, TVOC, O3, and the like, but are not limited thereto. Any hazardous material having a certain particle size can be a target to be measured and analyzed.

The hazardous material measuring apparatus 100 according to an embodiment of the present invention includes a processor 110, a spectrometer 120, an analysis unit 130, a fan 140, a light emitting unit 150, a database 160, a communication unit 170, a noise measuring module 180, a case 40, a lid 45, a hole 55, and an air distribution unit 60.

However, in some embodiments, the hazardous material measuring apparatus 100 may include fewer components or more components than those shown in FIG. 1.

The hazardous material measuring apparatus 100 further includes a position adjusting means capable of adjusting the position of the spectrometer 120 or a hyperspectral camera 190.

The processor 110 can adjust the position of the spectrometer 120 or the hyperspectral camera 190 by controlling the position adjusting means. Therefore, the hazardous material measuring apparatus 100 according to the embodiment of the present invention can target analysis target particles.

Furthermore, as illustrated in FIGS. 3 to 5, in some embodiments, components such as the lid 45, the hole 55, and the air distribution unit 60 may be formed on the case 40 or a frame of the hazardous material measuring apparatus 100, and other components such as the processor 110, the spectrometer 120 and the like may form a hazardous material measuring module 90.

In one embodiment of the present disclosure, the hazardous material measuring apparatus 100 includes the hazardous material measuring module 90, and the hazardous material measuring module 90 includes the air distribution unit 60, the light emitting unit 150, the spectrometer 120, the database 160, the analysis unit 130, and the processor 110.

In another embodiment of the present invention, the hazardous material measuring apparatus 100 includes the hazardous material measuring module 90, and the hazardous material measuring module 90 includes the air distribution unit 60, the hyperspectral camera 190, the database 160, the analysis unit 130, and the processor 110.

The external air to be measured with respect to hazardous materials is introduced and distributed into the air distribution unit 60.

The light emitting unit 150 emits light to a predetermined area of the air distribution unit 60, and includes at least one light source.

In one embodiment, the light emitting unit 150 May include a lens unit (not shown) for condensing the light emitted from the light source, or a filter capable of filtering light of a specific wavelength range.

The light emitting unit 150 and the air distribution unit 60 may be arranged such that the light emitted from the light emitting unit 150 is incident perpendicularly to the air distribution unit 60, but is not limited thereto.

The spectrometer 120 includes a light incident unit 123 that light changed in a path by colliding against hazardous material particles enters, and obtains an optical spectrum of the incident light.

In this case, the change of the path when the light irradiated from the light emitting unit 150 collides against the hazardous material particles in the air distribution unit 60 means scattering of light.

In addition, as mentioned above, the light emitting unit 150 emits light perpendicularly to the air distribution unit 60. In this instance, since hazardous material particles are contained in the external air existing in the air distribution unit 60, the irradiated light collides against the hazardous materials, and so, the optical path is changed.

In this instance, the path of the light is changed according to the size of the particles colliding with the light, and the hazardous material measuring apparatus 100 according to an embodiment of the present invention can determine the size of the target particles to be measured by using the change.

In addition, since the optical path may be changed depending on the size of the particles colliding with the light, the spectrometer 120 can determine the size of the target particles to be measured by using the change.

Therefore, the spectrometer 120 can determine an installation position in the hazardous material measuring apparatus 100 according to the size of the target particles in consideration of an angle of the optical path changed according to the particle size.

In one embodiment, the size of the light incident unit 123 is determined in order to increase precision.

Thus, the light colliding against larger particles or smaller particles which do not correspond to the hazardous materials cannot pass the light incident unit 123 since the optical path is changed at a different angle.

The control unit controls the analysis unit 130 to analyze the optical spectrum obtained through the spectrometer 120, thereby deriving at least one among the components and concentration of the hazardous material particles in the external air introduced into the air distribution unit 60.

More specifically, the analysis unit 130 further includes the database 160 storing optical spectrum information for each component which may be contained in the hazardous material.

In addition, the control unit analyzes the optical spectrum obtained through the spectrometer 120 based on the information stored in the database 160 through the analysis unit 130, thereby deriving components and concentration of hazardous materials in the external air introduced into the air distribution unit 60.

Referring to FIG. 6 the optical path is changed at a predetermined angle when light irradiated perpendicularly to the air distribution unit 60 collides against the hazardous material particles existing in the air distribution unit 60, and the light changed in the optical path passes a prism 127 through the light incident unit 123 of the spectrometer 120, thereby obtaining the optical spectrum of the spectrometer 120.

As described above, since only the light colliding against the hazardous material particles corresponding to the size of the target particles to be measured enters the light incident unit 123 and the spectrometer 120 obtains the optical spectrum of the light incident on the light incident unit 123, it is possible to accurately analyze components of the hazardous material particles having the size to be detected.

FIG. 3 illustrates the inside of the hazardous material measuring apparatus 100 on which the lid 45 is covered, and FIG. 4 illustrates the inside of the hazardous material measuring apparatus 100 from which the lid 45 is removed.

The hazardous material measuring apparatus 100 includes at least one fan 140 for introducing the external air into the hazardous material measuring apparatus 100.

The fan 140 includes a first fan 143 for introducing the external air into the hazardous material measuring apparatus 100, and a second fan 147 for introducing the external air introduced by the first fan 143 into the air distribution unit 60.

More specifically, the first fan 143 is mounted in the case 40, and the second fan 147 is mounted in the hazardous material measuring module.

Furthermore, the hole 55 is formed in the lid 45 of the hazardous material measuring apparatus 100 so that the external air is introduced by the first fan 143.

In addition, the hazardous material measuring apparatus 100 further includes a noise measuring module 180 capable of measuring external noise generated around the hazardous material measuring apparatus 100.

In this instance, the noise measuring module 180 is controlled by the processor 110, but may be configured separately from the hazardous material measuring module in order to minimize noise generated by the fan 140. For example, the noise measuring module 180 may be included in region A of FIG. 5.

The communication unit 170 may be configured separately from the hazardous material measuring module in order to secure a space of the hazardous material measuring module, and may be included in area A of the drawing.

Additionally, the arrangement position of the noise measuring module 180 and the communication unit 170 is merely an example for showing spatial utilization and measurement efficiency in the hazardous material measuring apparatus 100, but is not limited thereto.

FIG. 5 illustrates the inside configuration of the hazardous material measuring apparatus 100 of FIG. 4 in more detail, showing positions of the first fan 143 and the second fan 147. Referring to FIG. 5, the hazardous material measuring module is installed at one side in the case 40, and the first fan 143 is mounted at the other side in the case 40.

Moreover, the first fan 143 and the second fan 147 may have the same air volume or may be different from each other in terms of air volume.

More specifically, the first fan 143 may be higher in air volume and speed than the second fan 147.

Such a design is to introduce external air into the hazardous material measuring device 100, preferably, into the air distribution unit 60.

Furthermore, since the external air is introduced into the hazardous material measuring apparatus 100 by the first fan 143, the external air is introduced into the air distribution unit 60 by the second fan 147 which is lower in air volume or speed than the first fan 143.

In this instance, since too fast of an air speed may cause a measurement error, the first fan 143 and the hazardous material measuring module are arranged on the opposite sides, thereby excluding possibility of the measurement error and securing measurement accuracy.

In addition, the external air introduced into the hazardous material measuring apparatus 100 is introduced into the air distribution unit 60 by the second fan 147. In this instance, since the external air introduced into the air distribution unit 60 by the second fan 147 is weaker than that by the first fan 143, the light emitting unit 150 and the spectrometer 120 can measure the optical spectrum with high accuracy.

In one embodiment, the hazardous material measurement apparatus 100 starts measurement of hazardous materials on a predetermined time cycle or by a measurement request signal received from the outside, actuates the first fan 143 and the second fan 147 to introduce external air into the air distribution unit 60, stops the first fan 143 and the second fan 147 to reduce air speed, and irradiates light through the light emitting unit 150, thereby measuring hazardous materials.

While the above process proceeds, the external air has been already introduced into the air distribution unit 60, and the hazardous material measurement apparatus 100 starts measurement in a state in which the air speed is reduced, so that the hazardous material measurement apparatus 100 can measure with a higher accuracy.

Additionally, the hazardous material measuring apparatus 100 includes an outlet (not shown) for discharging the external air which was introduced into the air distribution unit 60 and of which measurement was completed. In this instance, the external air introduced into an air inlet is discharged to the outside through the outlet by wind power of the first fan 143 and the second fan 147.

The noise measuring module 180 can measure external noise generated around the hazardous material measuring apparatus 100.

The communication unit 170 transmits at least one among measurement data of the noise measuring module 180 and an analysis result analyzed by the analysis unit 130 to the server.

Referring to FIG. 2, the hazardous material measuring apparatus 100 according to an embodiment of the present invention includes a processor 110, an analysis unit 130, a fan 140, a database 160, a communication unit 170, a noise measuring module 180, and a hyperspectral camera 190.

The hazardous material measuring apparatus 100 illustrated in FIG. 1 obtains an optical spectrum of hazardous material particles by using the light emitting unit 150 and the spectrometer 120, but the hazardous material measuring apparatus 100 illustrated in FIG. 2 obtains a hyperspectral image of hazardous material particles by using the hyperspectral camera 190.

Therefore, the hazardous material measuring apparatus 100 illustrated in FIG. 2 has the same configuration as the hazardous material measuring apparatus 100 illustrated in FIG. 1, except that the hyperspectral camera 190 substituting for the light emitting unit 150 and the spectrometer 120.

The hyperspectral camera 190 images a predetermined area of the air distribution unit 60 to obtain a hyperspectral image of the hazardous material particles existing in the predetermined area.

The processor 110 analyzes components and concentration of the hazardous material particles contained in the external air introduced into the air distribution unit 60 through the analysis unit 130 based on the hyperspectral image.

In one embodiment, the hazardous material measuring apparatus 100 according to an embodiment of the present invention further includes a temperature-humidity measuring sensor, an atmospheric pressure measuring sensor, an illuminance measuring sensor, a noise measuring sensor, and a fire detection sensor.

Specifically, the fire detection sensor can detect a fire occurring within a predetermined distance from the apparatus 100, and the noise measuring sensor can measure external noise generated around the apparatus 100, and each of the sensors may provide a measured value to the processor 110 every predetermined cycle.

Through the above-described configuration, the hazardous material measuring apparatus 100 according to an embodiment of the present invention has functions of measuring temperature, humidity, air pressure, illuminance, noise, and the like and detecting a fire as well as the function of measuring and analyzing hazardous materials.

Figure 8:
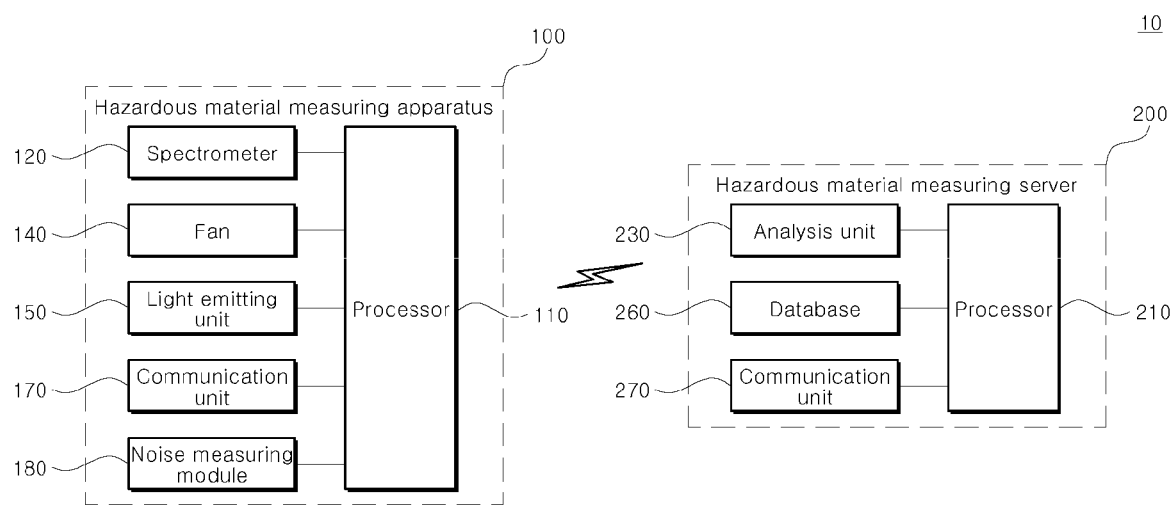
FIGS. 8 and 9 are block diagrams of a hazardous material measuring system according to an embodiment of the present invention.
Figure 9:
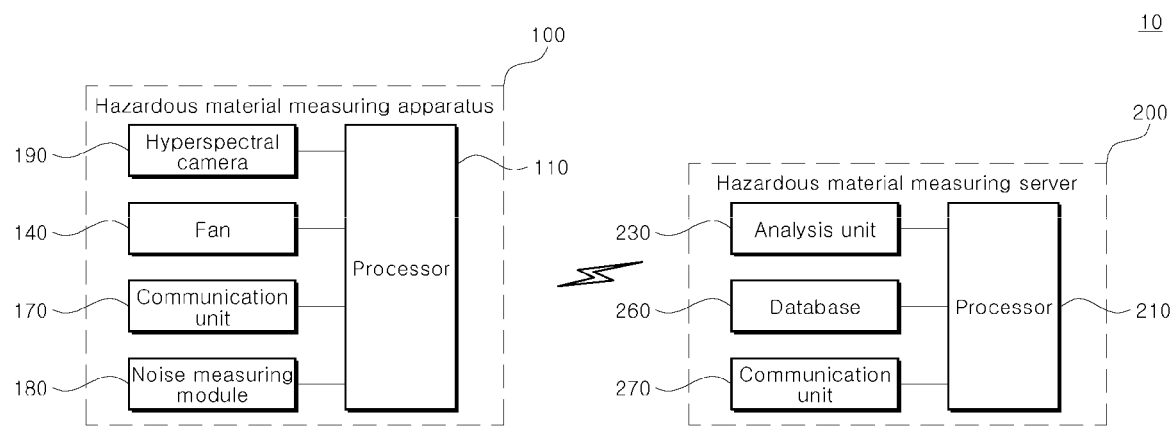

FIGS. 8 and 9 are block diagrams of a hazardous material measuring system 10 according to an embodiment of the present invention.

A difference between the hazardous material measuring apparatuses 100 illustrated in FIGS. 1 to 7 and the hazardous material measuring system 10 illustrated in FIGS. 8 and 9 is as follows.

Since the hazardous material measuring apparatus 100 in the hazardous material measuring system 10 serves only to measure hazardous materials and transmits the measured optical spectrum or hyperspectral image to the server, the analysis unit 130 and the database 160 may be included in a server.

Specifically, referring to FIG. 8, the hazardous material measuring system 10 includes the hazardous material measuring device 100 and a hazardous material analysis server 200.

The hazardous material measuring apparatus 100 includes an air distribution unit 60, a light emitting unit 150, a processor 110, a spectrometer 120, a fan 140, a communication unit 170, and a noise measuring module 180.

External air is introduced and distributed into the air distribution unit 60.

The fan 140 introduces the external air into the hazardous material measuring apparatus 100.

The light emitting unit 150 emits light to a predetermined area of the air distribution unit 60.

The spectrometer 120 includes an incident unit that light changed in a path by colliding against hazardous material particles enters, and obtains an optical spectrum of the incident light.

The processor 110 controls the components in the hazardous material measuring apparatus 100, and controls the analysis unit 130 to derive at least one among components and concentration of hazardous material particles in the external air introduced into the air distribution unit 60 on the basis of the optical spectrum obtained through the spectrometer 120.

In addition, the spectrometer 120 can determine the installation position according to the size of the target particles in consideration of an angle of the optical path changed according to the particle size.

The communication unit 170 transmits optical spectrum data obtained through the spectrometer 120 to the server.

The hazardous material analysis server 200 includes a processor 210, an analysis unit 230, a database 260, and a communication unit 270.

The communication unit 270 receives the optical spectrum data from the communication unit 170 of the hazardous material measuring apparatus 100.

The database 260 stores optical spectrum information for each component that is included in the hazardous material.

The processor 210 controls the analysis unit 230 to analyze the optical spectrum data, thereby deriving components and concentration of the hazardous material particles in the external air introduced into the air distribution unit 60.

More specifically, the analysis unit 230 analyzes components of the hazardous materials in the external air introduced into the air distribution unit 60 by using the information stored in the database 260.

Referring to FIG. 9, the hazardous material measuring system 10 includes a hazardous material measuring device 100 and a hazardous material analysis server 200.

The hazardous material measuring apparatus 100 includes an air distribution unit 60, a processor 110, a fan 140, a hyperspectral camera 190, a communication unit 170, and a noise measuring module 180.

External air is introduced and distributed into the air distribution unit 60.

The fan 140 introduces the external air into the hazardous material measuring apparatus 100.

The processor 110 controls the components in the hazardous material measuring apparatus 100.

The processor 110 controls the hyperspectral camera 190 to photograph a predetermined area of the air distribution unit 60, thereby obtaining a hyperspectral image of the hazardous material particles existing in the predetermined area.

The communication unit 170 transmits the hyperspectral image obtained through the hyperspectral camera 190 to the server.

The hazardous material analysis server 200 includes a processor 210, an analysis unit 230, a database 260, and a communication unit 270.

The communication unit 270 receives the hyperspectral image from the communication unit 170 of the hazardous material measuring apparatus 100.

The database 260 stores optical spectrum information for each component that is included in the hazardous material.

The processor 210 controls the analysis unit 230 to analyze the hyperspectral image, thereby deriving components and concentration of the hazardous material particles in the external air introduced into the air distribution unit 60.

More specifically, the analysis unit 230 analyzes components of the hazardous materials in the external air introduced into the air distribution unit 60 by using the information stored in the database 260.

Besides the above-mentioned differences, the hazardous material measuring system 10 is the same as the hazardous material measuring apparatuses 100 illustrated in FIGS. 1 to 7, and so, repeated description thereof will be omitted.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

Advantageous Effects

As described above, the present disclosure can obtain a hyperspectral image of the external air introduced into the hazardous material measuring apparatus through a hyperspectral camera, and analyze the hyperspectral image to analyze components and concentration of hazardous materials.

Moreover, the present disclosure can obtain a hyperspectral image of the external air introduced into the hazardous material measuring apparatus through a hyperspectral camera, and analyze the hyperspectral image to analyze components and concentration of hazardous materials.

Furthermore, the present disclosure can determine the position of a hazardous material measuring module according to the size of analysis target particles in consideration of an angle of an optical path varying according to the particle size, thereby determining the size of dust particles to be analyzed.

In addition, according to the present disclosure, the hazardous material measuring apparatus can measure even noise.

The advantages of the present disclosure are not limited to the above-mentioned advantages, and other advantages, which are not specifically mentioned herein, will be clearly understood by those skilled in the art from the following description.

The invention claimed is:

1. A hazardous material measuring apparatus comprising:
an air distribution unit which is mounted inside a case of the hazardous material measuring apparatus and into which external air is introduced and circulated;
a light emitting unit irradiating light to an area where the external air is distributed in the air distribution unit;
a light incident unit that light changed in a path by colliding against hazardous material particles enters;
a spectrometer obtaining an optical spectrum of the incident light;
a processor for deriving components and concentration of hazardous material particles contained in the external air introduced into the air distribution unit on the basis of the optical spectrum acquired through the spectrometer,
wherein an installation position of the spectrometer in the hazardous material measuring apparatus is determined according to the size of analysis target particles in consideration of an angle of the optical path changed according to the particle size; and
a noise measuring sensor measuring external noise generated around the hazardous material measuring apparatus.

2. The apparatus according to claim 1, wherein the optical path is changed when the light irradiated perpendicularly to the air distribution unit collides against the hazardous material particles contained in the external air in the air distribution unit 60, and
wherein the light changed in the optical path passes through the light incident unit so that the spectrometer obtains the optical spectrum.

3. The apparatus according to claim 1, further comprising:
at least one fan for introducing the external air into the hazardous material measuring apparatus.

4. The apparatus according to claim 3, wherein when receiving a hazardous material measurement request signal, the processor actuates the fan to introduce the external air into the air distribution unit, stops the fan or reduces air speed, and then, starts measurement of hazardous materials.

5. The apparatus according to claim 3, wherein the fan comprises:
a first fan for introducing the external air into the hazardous material measuring apparatus; and
a second fan for introducing the external air introduced by the first fan into the air distribution unit.

6. The apparatus according to claim 5, further comprising:
a case in which a hazardous material measuring module including at least one among the light emitting unit, the spectrometer, the processor and a database is installed,
wherein the hazardous material measuring module is installed at one side in the case, and
wherein the first fan is mounted at the other side in the case, and is higher in air volume or speed than the second fan.

7. The apparatus according to claim 1, further comprising:
a database storing optical spectrum information for each component which may be contained in the hazardous material,
wherein the processor analyzes the obtained optical spectrum on the basis of the optical spectrum information stored in the database, thereby deriving components and concentration of the hazardous materials contained in the external air.

8. A hazardous material measuring server comprising:
a communication unit receiving optical spectrum data from a hazardous material measuring apparatus;
a database storing optical spectrum information for each component which may be contained in the hazardous material; and
a processor analyzing optical spectrum data received through the communication unit to analyze components of hazardous material particles contained in external air introduced into an air distribution unit of the hazardous material measuring apparatus,
wherein the hazardous material measuring apparatus comprises:
an air distribution unit which is mounted inside a case of the hazardous material measuring apparatus and into which external air is introduced and circulated;
a light emitting unit irradiating light to an area where the external air is distributed in the air distribution unit;
a light incident unit that light changed in a path by colliding against hazardous material particles enters;
a spectrometer obtaining an optical spectrum of the incident light;
a processor transmitting the obtained optical spectrum data to the hazardous material measuring server through the communication unit, and
wherein an installation position of the spectrometer in the hazardous material measuring apparatus is determined according to the size of analysis target particles in consideration of an angle of the optical path changed according to the particle size; and a noise measuring sensor measuring external noise generated around the hazardous material measuring apparatus.

9. A hazardous material measuring apparatus comprising:
an air distribution unit into which external air is introduced and circulated;
a hyperspectral camera photographing a predetermined area of the air distribution unit to obtain a hyperspectral image of hazardous material particles existing in the predetermined area; and
an analysis unit for deriving components and concentration of the hazardous material particles contained in the external air introduced into the air distribution unit on the basis of the obtained hyperspectral image.

10. The apparatus according to claim 9, further comprising:
a database storing optical spectrum information for each component which may be contained in the hazardous material,
wherein the analysis unit analyzes the obtained hyperspectral image based on information stored in the database, thereby deriving components of the hazardous materials contained in the external air introduced into the air distribution unit.

11. The apparatus according to claim 9, further comprising:
at least one fan for introducing the external air into the hazardous material measuring apparatus.

* * * * *